United States Patent
Cho et al.

(10) Patent No.: US 11,661,079 B2
(45) Date of Patent: May 30, 2023

(54) METHOD FOR REDUCING THE POTENTIAL HAZARD IN ROAD TRAFFIC

(71) Applicant: Bayerische Motoren Werke Aktiengesellschaft, Munich (DE)

(72) Inventors: Young-Jae Cho, Kirchheim b. Muenchen (DE); Jan-Mark Kunberger, Munich (DE); Georg Movsisyan, Munich (DE); Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 90 days.

(21) Appl. No.: 16/650,249

(22) PCT Filed: Aug. 21, 2018

(86) PCT No.: PCT/EP2018/072480
§ 371 (c)(1),
(2) Date: Mar. 24, 2020

(87) PCT Pub. No.: WO2019/081090
PCT Pub. Date: May 2, 2019

(65) Prior Publication Data
US 2020/0269872 A1    Aug. 27, 2020

(30) Foreign Application Priority Data
Oct. 27, 2017    (DE) .................... 10 2017 219 302.6

(51) Int. Cl.
*B60W 60/00*    (2020.01)
*B60W 30/08*    (2012.01)
*G08G 1/01*    (2006.01)

(52) U.S. Cl.
CPC ........ *B60W 60/0011* (2020.02); *B60W 30/08* (2013.01); *B60W 60/0015* (2020.02); *G08G 1/0133* (2013.01); *G08G 1/0145* (2013.01)

(58) Field of Classification Search
CPC ......... B60W 60/0011; B60W 60/0015; B60W 30/08; G08G 1/0133; G08G 1/0145
See application file for complete search history.

(56) References Cited

U.S. PATENT DOCUMENTS 9,513,134 B1    12/2016   Ishikawa et al.
9,905,133 B1*    2/2018   Kumar ................... G08G 1/205
(Continued)

FOREIGN PATENT DOCUMENTS

CN    104488010 A    4/2015
CN    106169245 A    11/2016
(Continued)

OTHER PUBLICATIONS

International Search Report (PCT/ISA/210) issued in PCT Application No. PCT/EP2018/072480 dated Dec. 7, 2018 with English translation (seven (7) pages).
(Continued)

*Primary Examiner* — Maceeh Anwari
*Assistant Examiner* — Charles Pall
(74) *Attorney, Agent, or Firm* — Crowell & Moring LLP

(57) ABSTRACT

A method for reducing the potential hazard of a number of vehicles with heterogenous drives includes receiving on a backend server hazard data of the vehicles which includes current fill state data of at least one energy store and the current position of the respective vehicles, identifying on a backend server hazard situation data comprising the position and the type of the hazard situation, evaluating on the backend server the hazard data of the vehicles with respect to the hazard situation data, and automatically initiating at
(Continued)

least one protective measure corresponding to the evaluated hazard data.

8 Claims, 3 Drawing Sheets

(56) References Cited

U.S. PATENT DOCUMENTS

| | | | | |
|---|---|---|---|---|
| 2008/0234888 | A1* | 9/2008 | Zanardelli | H04L 43/0817 |
| | | | | 701/34.2 |
| 2011/0177791 | A1 | 7/2011 | Staehlin et al. | |
| 2014/0302774 | A1 | 10/2014 | Burke et al. | |
| 2015/0154864 | A1 | 6/2015 | Hainzlmaier et al. | |
| 2016/0321929 | A1 | 11/2016 | Nordbruch et al. | |
| 2017/0076509 | A1* | 3/2017 | Scofield | A61B 5/02055 |
| 2018/0238698 | A1* | 8/2018 | Pedersen | G06N 5/048 |

FOREIGN PATENT DOCUMENTS

| | | |
|---|---|---|
| CN | 107082071 A | 8/2017 |
| DE | 38 43 043 A1 | 6/1990 |
| DE | 10 2006 057 741 A1 | 9/2007 |
| DE | 11 2005 002 730 T5 | 1/2008 |
| DE | 10 2009 015 513 A1 | 10/2009 |
| DE | 10 2011 119 544 B3 | 5/2013 |
| DE | 102011119544 B3 * 5/2013 ....... G08G 1/096716 |
| DE | 10 2012 208 000 A1 | 11/2013 |
| DE | 10 2014 204 694 A1 | 10/2014 |
| DE | 10 2013 220 430 A1 | 4/2015 |
| WO | WO-2015051990 A2 * 4/2015 ....... G08G 1/096741 |

OTHER PUBLICATIONS

German-language Written Opinion (PCT/ISA/237) issued in PCT Application No. PCT/EP2018/072480 dated Dec. 7, 2018 (six (6) pages).

German-language Search Report issued in German Application No. 10 2017 219 302.6 dated Jul. 19, 2018 with partial English translation (17 pages).

Chinese-language Office Action issued in Chinese Application No. 201880062511.2 dated Aug. 4, 2021 with English translation (19 pages).

* cited by examiner

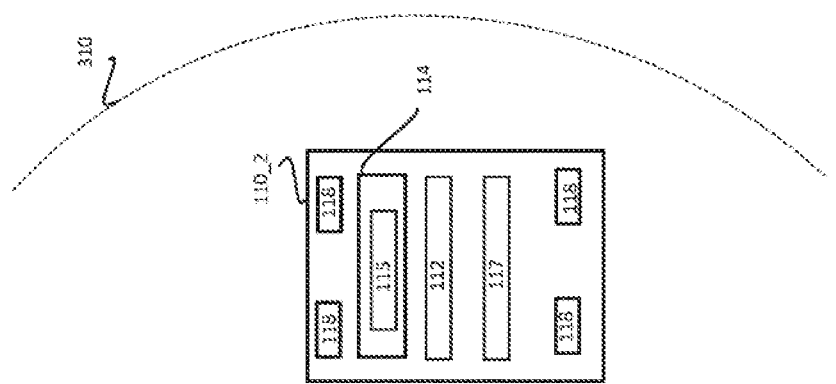
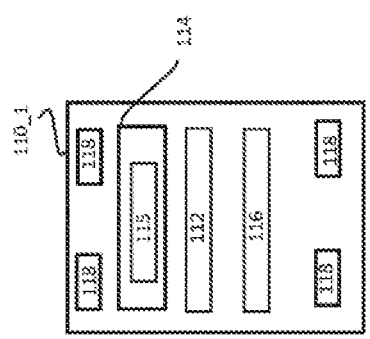
Fig. 3

METHOD FOR REDUCING THE POTENTIAL HAZARD IN ROAD TRAFFIC

CROSS REFERENCE TO RELATED APPLICATIONS

This application is a National Phase Application of PCT International Application No. PCT/EP2018/072480, filed Aug. 21, 2018, which claims priority under 35 U.S.C. § 119 from German Patent Application No. 10 2017 219 302.6, filed Oct. 27, 2017., the entire disclosures of which are herein expressly incorporated by reference.

BACKGROUND AND SUMMARY OF THE INVENTION

The present invention relates to a method for reducing the hazard potential in road traffic.

Vehicles having various drive concepts are known. Besides vehicles having internal combustion engines, e.g. gas and diesel engines, there are electric vehicles known, for example electrically operated bicycles and scooters, but in particular also electric cars having at least supporting electric propulsion. As such, micro, mild and full hybrid vehicles are known, which realize parallel, split-power, serial hybrid drive concepts. In particular, plug-in hybrids are known, in which the electrical energy stores—as in the case of purely electric drive concepts—can be charged via the electricity grid, these normally also having at least one internal combustion engine. Vehicles that comprise a pressure container for storing a fuel in the vehicle are also known. The fuel can be compressed or liquefied natural gas or hydrogen, for example. The increasing number of vehicles and the heterogeneity of the drive concepts thereof hold further dangers beyond road accidents per se. Examples of such further dangers are e.g. in association with one or more burning vehicles, pile-ups, (terrorist) attacks, etc. In particular, vehicles behave differently at e.g. high temperatures, etc., depending on drive concepts. In particular for rescue and/or emergency services, it is difficult or even impossible to assess the hazard potential accompanying vehicles that are in or around such a hazard situation in regard to the individual hazard potential and/or to take appropriate safety measures.

The object of the invention is to demonstrate a solution that reduces the hazard potential in road traffic against the background of heterogeneous drive concepts in vehicles.

This object is achieved according to the invention by the features of the independent claim. Preferred embodiments are the subject of the dependent claims.

The aforementioned object is achieved by a method for reducing the hazard potential of a multiplicity of vehicles having heterogeneous drives, comprising:

receiving, on a backend server, hazard data of the vehicles, wherein the hazard data comprise current filling state data of at least one energy store and a current position of the respective vehicles;

capturing, on the backend server, hazard situation data comprising a position and a type of a hazard situation;

evaluating, by means of the backend server, the hazard data of the vehicles with reference to the hazard situation data; and automatically initiating at least one protective measure in accordance with the evaluated hazard data.

The term vehicle covers in particular passenger vehicles, trucks, buses, campers, motorcycles, etc.

The backend server is a central data pool and can comprise a computing device and also a memory device, e.g. a database, in which data can be stored, managed and processed centrally or under central control and externally to vehicles. It may be necessary for the user of each vehicle to perform one-off registration of the vehicle (e.g. to set up a suitable account) on the backend server (or another suitable computing device providing an appropriate service) first. The one-off registration can comprise storing the drive concept(s) of the vehicle as drive data and also a suitable vehicle identification number (ID). The drive data comprise data concerning the drive(s) of the respective vehicle, e.g. exclusive internal combustion engine, plug-in hybrid, pure electric vehicle, (additional) pressure container for storing natural gas or hydrogen (e.g. cryogenic pressure container for storing hydrogen, high-pressure gas container for storing hydrogen, pressure container for storing compressed or liquefied natural gas, etc.). Further current and/or future drive types are conceivable. As such, data that are sent from the respective vehicle to the backend server below can be explicitly associated with the vehicle and with the drive concept(s). The user of the vehicle can be its owner, administrator, driver, etc., for example.

The backend server is configured to receive hazard data from the (previously registered) vehicles. By way of example, each vehicle can be configured to transmit the hazard data at predefinable or predefined intervals of time, e.g. every minute, every 2, 5, 10 or 20 minutes. Furthermore or alternatively, each vehicle can be configured to transmit the hazard data for predefined events, e.g. at the start of every journey, on every stop, whenever parking, after a predefinable or predefined energy consumption, when data transfer requests are available (e.g. required mobile radio standards such as LTE, 3 G, . . . ), etc.

The hazard data comprise current filling state data of at least one energy store of the vehicle. Depending on the drive concept, various energy stores are used that can be recorded during the one-off registration of the vehicle on the backend server, e.g. fuel tank for the internal combustion engine, (electric) battery for the electric drive, hydrogen tank for hydrogen drive, etc. In the case of hybrid drives, the respective drives in the vehicle are powered by different energy stores. For the combination of electric motor and internal combustion engine, for example, the energy stores used are electric battery and fuel tank. The respective vehicle can ascertain or read the filling state of the energy store(s) by using a control unit, for example. These data correspond to the filling state data. In other words, the filling state data comprise at least the currently stored amount of energy and energy type of the vehicle. These are transferred to the backend server. In the case of a pressure tank, the filling state data can moreover comprise the expansion energy thereof in the respective state. In the case of chemical energy stores or in the case of chemical storage of the energy, the filling state data can moreover comprise details about the stored medium (hydrogen, natural gas, etc.). In the case of batteries, the filling state data can moreover comprise data concerning the cells installed or used, e.g. the chemical composition, physical size and/or physical shape thereof.

Advantageously, the filling state data allow the hazard potential of the respective vehicle, but also this hazard potential in combination with different events, to be rated.

In another example, it is also possible for only the sensor data to be transmitted to the backend server, the filling state data and—if applicable—the expansion energy for the pressure tanks being determined by the backend server in a manner known from the prior art.

If relevant changes are made to the vehicle, such as e.g. a conversion, a tank enlargement, an expansion of the battery stores, etc., the hazard data can change. If changes are made to the vehicle that lead to a change in the hazard data, the hazard data need to be updated on the backend server. To this end, the change can involve a "trigger" being set that leads to the hazard data being updated manually, e.g. by the user of the vehicle, or automatically.

The hazard data moreover comprise a current position of the respective vehicle. The current position or current position data of the vehicle can be ascertained by using a navigation satellite system. The navigation satellite system can be any current or future global navigation satellite system (GNSS) for position determination and navigation by means of the reception of the signals from navigation satellites and/or pseudo lights. By way of example, these can be the Global Positioning System (GPS), GLObal NAvigation Satellite System (GLONASS), Galileo positioning system and/or BeiDou Navigation Satellite System. By way of example, the vehicle can comprise a module suitable for detecting the position of the vehicle in the respective system. In the example of GPS, the vehicle can comprise a position finding unit comprising a GPS module designed to find the current GPS position of the vehicle.

The hazard data—comprising the filling state data and the current position of the vehicle—are finally sent to the backend server. Each vehicle can comprise a communication module. The communication module can be a communication module arranged in the vehicle that is capable of setting up a communication connection to other communication subscribers, for example to the backend server. The communication module can comprise a subscriber identity module or a SIM card that is used to set up a communication connection via a mobile radio system. The subscriber identity module explicitly identifies the communication module in the mobile radio network. The communication connection can be a data connection (e.g. packet switching) and/or a conductor-based communication connection (e.g. circuit switching). Every communication between the vehicle and other communication subscribers can be effected via the communication module.

The backend server is moreover configured to capture hazard situation data. The hazard situation data comprise at least one position or position data (see above, e.g. GPS position data) and a type of hazard situation. A hazard situation can be for example a vehicle fire, a house fire, a (poisonous) gas escape from an industrial plant, a (terrorist) attack, a pile-up, a disturbance, a wrong-way driver, a defective autonomously driving vehicle, a bomb discovery, etc. All other hazard situations are also possible.

By way of example, the hazard situation data can be transmitted by an intelligent object and received on the backend server. The intelligent object can be for example a system of an emergency center that automatically transmits a data record comprising the hazard situation data to the backend server when a hazard situation arises. In another example, the backend server can be configured to request or retrieve (polling) hazard situation data from a central hazard data pool (e.g. a central monitoring station), at regular intervals of time. By way of example, hazard situation data can be transferred from intelligent traffic lights that detect when they are driven through on red and automatically transmit this to the backend server. Furthermore or alternatively, hazard situation data can be automatically transmitted to the backend server from an intelligent freeway on-ramp that detects a wrong-way driver.

The backend server can be configured to identify relevant hazard data first. By way of example, the memory unit of the backend server can first of all contain, for each hazard situation, a defined region, a radius, etc., around the position of the hazard situation that is affected by the hazard situation or is subject to a threat. In this example, the backend server can merely take into consideration hazard data from vehicles whose current or last position (e.g. GPS position) is within this predefined region or area, radius, etc. The hazard data are also taken into consideration in this case.

The backend server is configured to evaluate the (relevant) hazard data of the vehicles with reference to the hazard situation data. This can be accomplished by using known data processing techniques. By way of example, the backend server can perform a data analysis for the stored data with reference to the hazard situation data (e.g. machine learning analysis, data modeling, pattern recognition, prediction analysis, correlation analysis, etc.) in order to predict, calculate or identify implicit relationships or conclusions for the stored data with reference to the hazard potential. A multiplicity of data learning algorithms and classification techniques can be considered for this, such as e.g. partial least square regression (PLS regression), random forest and/or principal component analysis (PCA).

The backend server is configured to initiate at least one protective measure in accordance with the evaluated hazard data.

Preferably, the evaluating of the hazard data moreover comprises evaluating surroundings data with reference to the position of the hazard situation.

The backend server can be configured to retrieve surroundings data, for example relating to a predefined region and/or radius, the position of the hazard situation (e.g. digital roadmaps), from appropriate service providers via a suitable network, e.g. the Internet.

Furthermore or alternatively, the backend server can be configured to capture the surroundings data using what is known as crowd sourcing. In the case of crowd sourcing, it is possible for a wide variety of data beyond the hazard data to be transmitted from the vehicles and further participating intelligent objects to the central backend server and to be managed centrally. The additional data of the vehicles can be for example:
  weather data, e.g. captured by one or more rain and/or sunshine and/or temperature sensors in the vehicle;
  current surroundings information, e.g. captured by cameras fitted in or on the vehicle;
  further current surroundings data, e.g. provided by one or more digital cameras, radar and/or lidar and/or sonar sensors of the vehicle.

The vehicles can capture the data for predefined events and can transmit said data to the backend server. This can happen at regular intervals of time, at predefined times and/or for predefined events, for example. Furthermore or alternatively, the backend server is able, after a hazard situation has been detected, to ask vehicles situated in a predefined area or radius around the hazard situation to capture one or more of the aforementioned data items using the appropriate sensors in the vehicle and to transmit said data to the backend server. In this example, the sensors that are installed on and/or in the vehicle can be stored during the one-off registration of each of the vehicles.

Intelligent objects are capable of using a communication module (analogously to the communication module in the vehicle, see above) to set up a communication connection to other communication subscribers, e.g. the backend server, so as to thus transmit data to the backend server. These data can comprise further hazard data, traffic information, changes in the route, etc. From these data, the at least one central backend server can generate a highly up-to-date digital map of the surroundings. Further examples of intelligent objects are networked (road) infrastructure systems that can each use appropriate sensors—analogously to vehicles—to capture their surroundings and can transmit these to the backend server. Intelligent objects can comprise intelligent road signs and/or intelligent traffic lights that are capable of detecting traffic-threatening violations and of transmitting them as hazard data to the backend server. Intelligent objects can furthermore or alternatively comprise filling stations or filling equipment that can detect an end-of-life status of a pressure container and thus cannot fill it.

The result of the evaluating of the hazard data can be a hazard potential.

Preferably, the surroundings data comprise:
a population density;
a traffic density at the time of the hazard situation;
main thoroughfares in a predefined radius around the position of the hazard situation;
current weather data;
a model of the surroundings of a vehicle comprising a fully autonomous driving mode; and/or
other hazard data comprising the predefined radius around the position of the hazard situation.

Preferably, the protective measure comprises notifying rescues and/or emergency services about a hazard potential in accordance with the evaluated hazard data.

The backend server can be configured to transmit a hazard potential, which can be the result of the evaluation of the hazard data, to rescue and/or emergency services.

Advantageously, rescue and/or emergency services can prepare themselves for the hazard situation better, which reduces the hazard potential with reference to the hazard situation.

Preferably, the protective measure comprises division of a predefined region around the position of the hazard situation into hazard zones in accordance with the evaluated hazard data.

The backend server can be configured to divide a predefined region around the position of the hazard situation into hazard zones in accordance with the evaluated hazard data. The division into hazard zones can also be transmitted to rescue and/or emergency services, for example. Advantageously, rescue and/or emergency services can thus better prepare themselves for the hazard situation, which reduces the hazard potential with reference to the hazard situation.

Preferably, the protective measure comprises a recommendation to clear buildings and/or squares.

Preferably, the protective measure comprises activation of at least one function of a safety device.

Safety devices can be intelligent safety objects, e.g. intelligent ventilation systems in buildings, vehicles, etc.; intelligent sprinkler systems in buildings, vehicles, intelligent infrastructure systems, etc. Functions of the safety devices can be switching the ventilation on or off, switching the sprinkler system on or off, etc. The at least one function of a safety device is activated with reference to the evaluated hazard data.

By way of example, a hazard situation can be a burning building. The backend server can send a message to activate the sprinkler installation to an intelligent sprinkler system in the building. Furthermore or alternatively, the backend server can transmit a message to intelligent traffic lights in a predefined region or area around the smoldering building, so that they set their signals such that no further vehicles enter this region, but rather they can only leave.

Preferably, at least one vehicle comprises a fully autonomous driving mode; wherein the protective measure comprises asking the vehicle comprising the fully autonomous driving mode to autonomously leave a predefinable region around the position of the hazard situation.

Vehicles that comprise a fully autonomous or automatic driving mode are known. Such vehicles can move autonomously in road traffic by means of a driver assistance device or an autopilot. The vehicle can therefore be driven independently of a user or driver of the vehicle, so that a driver does not need to be in the vehicle when the fully autonomous driving mode is activated. While the fully autonomous driving mode is active, the driver assistance device continually processes current surroundings data. To this end, there are a multiplicity of different sensors fitted in or on the vehicle in order to capture surroundings data. The sensors can be for example ultrasonic sensors, lidar sensors, radar sensors, cameras, etc. The captured sensor data are then processed in the control device in order to ascertain a model of the surroundings of the vehicle. The fully autonomous driving mode is executed on the basis of the model of the surroundings.

By way of example, the backend server can be configured to transmit an applicable message to the communication unit of the vehicle. The message can comprise a request to leave a predefined region around the hazard situation. The message can comprise a representation of the predefined region on a digital map. Alternatively, the message can comprise the request to leave the predefined region and also a position on the digital map toward which the vehicle is supposed to move. The position is outside the predefined or predefinable region around the position of the hazard situation. A computing unit can process the message and a control module in the vehicle can control the vehicle such that it autonomously leaves the predefined region or moves to the received position outside the hazard situation. The vehicle can comprise a navigation module storing the applicable digital roadmap locally in the vehicle. Advantageously, parking vehicles comprising an autonomous driving mode can thus move away from the hazard situation, which reduces the hazard potential around the hazard situation further.

Preferably, the protective measure comprises a warning to other road users.

By way of example, the backend server can be configured to send an applicable message to the communication units of vehicles of other road users affected by the hazard situation. The message can comprise a warning that can be output via a suitable output unit of the respective vehicles.

Preferably, the protective measure comprises active intervention in the driving dynamics and/or trajectory planning of other road users.

The backend server can for example transmit a suitable message to the communication unit of vehicles that support highly automated driving (HAF) or fully automated driving (VAF). The message can comprise applicable data suitable for vehicles affected by the hazard situation to actively intervene in the driving dynamics and/or trajectory planning.

These and other objects, features and advantages of the present invention will become clear from studying the detailed description of preferred embodiments that follows and the accompanying figures. It is apparent that—although embodiments are described separately—individual features therefrom can be combined to form additional embodiments.

BRIEF DESCRIPTION OF THE DRAWINGS

FIG. 3 shows an exemplary scenario in which the hazard potential in road traffic is reduced by a corresponding method.

DETAILED DESCRIPTION OF THE DRAWINGS

Figure 1:
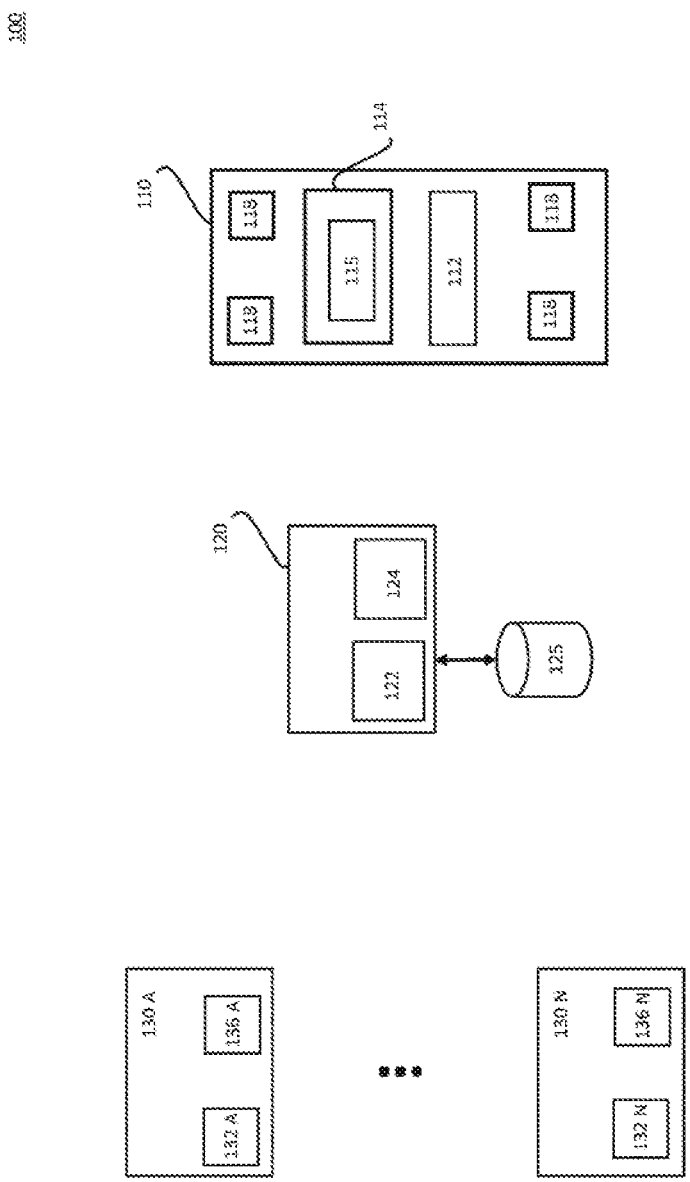
FIG. 1 shows a schematic system suitable for performing a method for reducing the hazard potential in road traffic.

FIG. 1 shows a schematic system 100 on which a method 200 for reducing the hazard potential in road traffic can be performed. The method 200 is explained in more detail in exemplary fashion later on with reference to FIGS. 2 and 3.

The system 100 comprises at least one backend server 120. The backend server 120 is a central data pool and can comprise a computing unit 124 and also a memory unit 125, e.g. a database 125. The backend server 120 can be used to store, manage and process data centrally or under central control and externally to vehicles. It may be necessary for the user of each vehicle 110 to perform a one-off registration (e.g. to set up a suitable account) on the backend server 120 (or another suitable computing device providing an applicable service) first in order to register the vehicle 110 once. In another example, the one-off registration can be performed by the manufacturer for the purposes of first registration. The one-off registration can comprise storage of the drive concept(s) of the vehicle as drive data and of a suitable vehicle identification number (ID). The drive data comprise data concerning the drive(s) of the respective vehicle, e.g. exclusive internal combustion engine, plug-in hybrid, pure electric vehicle, (additional) pressure container for storing natural gas or hydrogen (e.g. cryogenic pressure container for storing hydrogen, high-pressure gas container for storing hydrogen, pressure container for storing compressed or liquefied natural gas, etc.). Further current and/or future drive types are conceivable. As such, data sent from the respective vehicle 110 to the backend server below can be explicitly associated with the vehicle and with the drive concept(s). The user of the vehicle 110 can be for example the owner, (fleet) administrator, hirer, etc., thereof. If relevant changes to the vehicle 110—such as e.g. a conversion with reference to one or more drive types, a tank enlargement, an expansion of the battery stores, etc.—are made, the hazard data with reference to the vehicle 110 can change.

If changes are made to the vehicle 110 that lead to a change in the hazard data, these data need to be updated on the backend server 120 or in the memory unit 125. To this end, the change can involve a "trigger" being set, by means of which the data are updated manually, e.g. by the user of the vehicle 110, or automatically. In order to ensure a change to the hazard data on the backend server 120, the trigger can be provided by a controller (not shown) of a sensor installed in the changed vehicle component, for example. This controller is permanently (nonremovably) connected to the changed component (e.g. pressure tank). On startup, the controller sends a component identification number (ID) to a central vehicle controller. The central vehicle controller compares the received component ID against (approved) component IDs stored in the memory unit 125. If the component ID is not stored in the memory unit 125, the vehicle can go into a safe state (e.g. operation is not possible).

The backend server 120 is configured to receive hazard data from a multiplicity of (registered) vehicles 110. Each vehicle 110 can comprise a communication module 112. The communication module 112 can be arranged in the vehicle 110, and is capable of setting up a communication connection to other communication subscribers, for example to the backend server 120. The communication module 112 can comprise a subscriber identity module or a SIM card (not shown) that is used to set up a communication connection via a mobile radio system. The subscriber identity module explicitly identifies the communication module in the mobile radio network. The communication connection can be a data connection (e.g. packet switching) and/or a conductor-based communication connection (e.g. circuit switching). Every communication between the vehicle 110 and other communication subscribers can be effected via the communication module 112.

By way of example, each vehicle 110 can be configured to transmit or send the hazard data to the backend server 120 at predefinable or predefined intervals of time, e.g. every minute, every 2, 5, 10 or 20 minutes. Furthermore or alternatively, each vehicle 110 can be configured to transmit the hazard data for predefined events, e.g. at the start of every journey, on every stop, whenever parking, after a predefinable or predefined energy consumption, when data transfer requests are available (e.g. required mobile radio standards such as LTE, 3G, . . . ), etc.

The hazard data comprise current filling state data of at least one energy store (not shown) of the applicable vehicle 110. Depending on the drive concept, various energy stores are used, e.g. fuel tank for the internal combustion engine, (electric) battery for the electric drive, hydrogen tank for hydrogen drive, etc. In the case of hybrid drives, the respective drives in the vehicle are powered by different energy stores. For the combination of electric motor and internal combustion engine, for example, the energy stores used are electric battery and fuel tank. The respective vehicle 110 can ascertain or read the filling state of the energy store(s) by using a control unit 115, for example.

The hazard data moreover comprise a current position of the respective vehicle 110. Current position data of the vehicle 110 can be ascertained by using a navigation satellite system. In the example of GPS, the vehicle 110 can comprise a position finding unit (not shown) comprising a GPS module designed to find the current GPS position of the vehicle 110. In other words, the filling state data comprise at least the currently stored amount of energy and energy type of the vehicle 110. These are transferred to the backend server 120. In the case of a pressure tank, the filling state data can moreover comprise the expansion energy thereof in the respective state. In the case of chemical energy stores or in the case of chemical storage of the energy, the filling state data can moreover comprise details about the stored medium (hydrogen, natural gas, etc.). In the case of batteries, the filling state data can moreover comprise data concerning the cells installed or used, e.g. the chemical composition, physical size and/or physical shape thereof.

Advantageously, the filling state data allow the hazard potential of the respective vehicle 110, but also this hazard potential in combination with different events, to be rated.

In another example, it is also possible for only the sensor data to be transmitted to the backend server 120, the filling state data and—if applicable—the expansion energy for the pressure tanks being determined by the backend server 120 in a manner known from the prior art.

If relevant changes are made to the vehicle 110, such as e.g. a conversion, a tank enlargement, an expansion of the battery stores, etc., the hazard data can change. If changes are made to the vehicle 110 that lead to a change in the hazard data, the hazard data need to be updated on the backend server 120. To this end, the change can involve a "trigger" being set by means of which the data are updated manually, e.g. by the user of the vehicle 110, or automatically.

The backend server 120 is moreover configured to capture hazard situation data. The hazard situation data comprise at least one position or position data (see above, e.g. GPS position data) and also a type of a hazard situation. A type of a hazard situation is for example a vehicle fire, a house fire, a (poisonous) gas escape from an industrial plant, a (terrorist) attack, a pile-up, a disturbance, a wrong-way driver, a defective autonomous vehicle function, a bomb discovery, etc.

By way of example, the hazard situation data can be received from an intelligent object 130A . . . 130N. Intelligent objects 130A . . . 130N are capable of using a communication module 130A . . . 130N (analogously to the communication module 112 in the vehicle 110, see above) to set up a communication connection to the backend server 120 and further communication subscribers so as to thus transmit and/or receive data to or from the backend server 120. The intelligent objects 130A . . . 130N can moreover comprise a position finding module. Examples of intelligent objects are networked (road) infrastructure systems that can each use appropriate sensors—analogously to vehicles—to capture their surroundings and can transmit these to the backend server. The intelligent object 130A . . . 130N can be for example a system of an emergency center that automatically transmits a data record comprising the hazard situation data to the backend server 120 when a hazard situation arises. In another example, the backend server 120 can be configured to request or retrieve (polling) hazard situation data from a central hazard data pool, e.g. a central monitoring station, at regular intervals of time. By way of example, hazard situation data can be transferred from intelligent traffic lights 130A . . . 130N that detect when they are driven through on red and automatically transmit this to the backend server 120. Furthermore or alternatively, hazard situation data can be automatically transmitted to the backend server 120 from an intelligent freeway on-ramp 130A . . . 130N that detects a wrong-way driver. As an appropriate countermeasure, the backend server 120 can trigger or initiate the following protective actions, for example:

preventing a trajectory for the vehicle that has driven through the intelligent traffic lights 130A . . . 130N on red (e.g. by slowing down the aforementioned vehicle and/or making way); and/or taking into consideration, by means of the backend server 120, the trajectory of the aforementioned vehicle (red-run trajectory) in the driving strategy of other road users (safe reaction to red-run trajectory).

The backend server 120 is configured to evaluate the (relevant) hazard data of the vehicles 110 with reference to the hazard situation data. The backend server 120 can be configured to identify relevant hazard data first. By way of example, the memory unit 125 of the backend server 120 can first be used to store, for each hazard situation, a region, a radius, etc., around the position (e.g. GPS position) of the hazard situation that is affected by the hazard situation. In this example, the backend server 120 can merely take into consideration hazard data from vehicles 110 whose current or last position is within this region or area, radius, etc.

This can be accomplished by using known data processing techniques. By way of example, the backend server 120 can perform a data analysis for the stored data with reference to the hazard situation data (e.g. machine learning analysis, data modeling, pattern recognition, prediction analysis, correction analysis, etc.) in order to predict, calculate or identify implicit relationships or conclusions for the stored data with reference to the hazard potential. A multiplicity of data learning algorithms and classification techniques can be considered for this, such as e.g. partial least square regression (PLS regression), random forest and/or principal component analysis (PCA).

The evaluating of the hazard data can moreover comprise evaluating surroundings data with reference to the position of the hazard situation. The surroundings data can be received on the backend server 120 periodically before a hazard situation is detected.

Furthermore or alternatively, the backend server 120 can retrieve data with reference to the hazard situation after the hazard situation is detected.

The backend server 120 can be configured to retrieve surroundings data for example relating to a predefined region and/or radius around the position of the hazard situation (e.g. digital roadmaps) from appropriate service providers via a suitable network, e.g. the Internet.

By way of example, the backend server can be configured to capture the surroundings data using what is known as crowd sourcing. In the case of crowd sourcing, it is possible for a wide variety of data beyond the hazard data to be transmitted from the vehicles 110 and further participating intelligent objects 130A . . . 130N to the backend server 120 and to be managed centrally. The additional data of the vehicles 110 can be for example:

weather data, e.g. captured by one or more rain and/or sunshine and/or temperature sensors 118 in the vehicle 110;

current surroundings information, e.g. captured by cameras 118 fitted in or on the vehicle 110;

further current surroundings data, e.g. provided by radar and/or lidar and/or sonar sensors 118 of the vehicle 110.

A dangerous traffic situation can also arise as a result of a detected inattentive driver in combination with an active driver assistance system. If for example an inattentive driver is detected by an active driver assistance system, the affected vehicle 110 can go into a safe state (e.g. vehicle 110 moves at the edge of the road with its hazard warning lights activated). If the fallback level is the driver, the hazard situation can be mitigated by warning other affected road users (e.g. by means of the backend server 120) or by means of active intervention in the vehicle dynamics in the case of autonomously driving vehicles 110.

The vehicles 110 can capture the data for predefined events and can transmit said data to the backend server 120. This can be done at regular intervals of time, at predefined times and/or for predefined events, for example. Furthermore or alternatively, the backend server 120 is able, after a hazard situation has been detected, to ask vehicles 110 situated in a predefined region, radius, etc., around the position of the hazard situation to capture one or more of the aforementioned data items using the appropriate sensors 118 in the vehicle 110 and to transmit said data to the backend server 120. In this example, the sensors 118 that are installed on and/or in the vehicle 110 can be stored on the backend server 120 during the one-off registration of each of the vehicles 110.

The intelligent objects 130A . . . 130N can e.g. use appropriate sensors (not shown) to likewise capture surroundings data (analogously to the vehicle 110, see above) and can transmit said surroundings data to the backend server 120, or can retrieve them therefrom. From these data, the backend server 120 can generate a highly up-to-date digital map of the surroundings with reference to the hazard situation. The digital map of the surroundings around the hazard situation can be transmitted to rescue services or emergency services, for example, to allow better preparation for the rescue or action.

Figure 2:
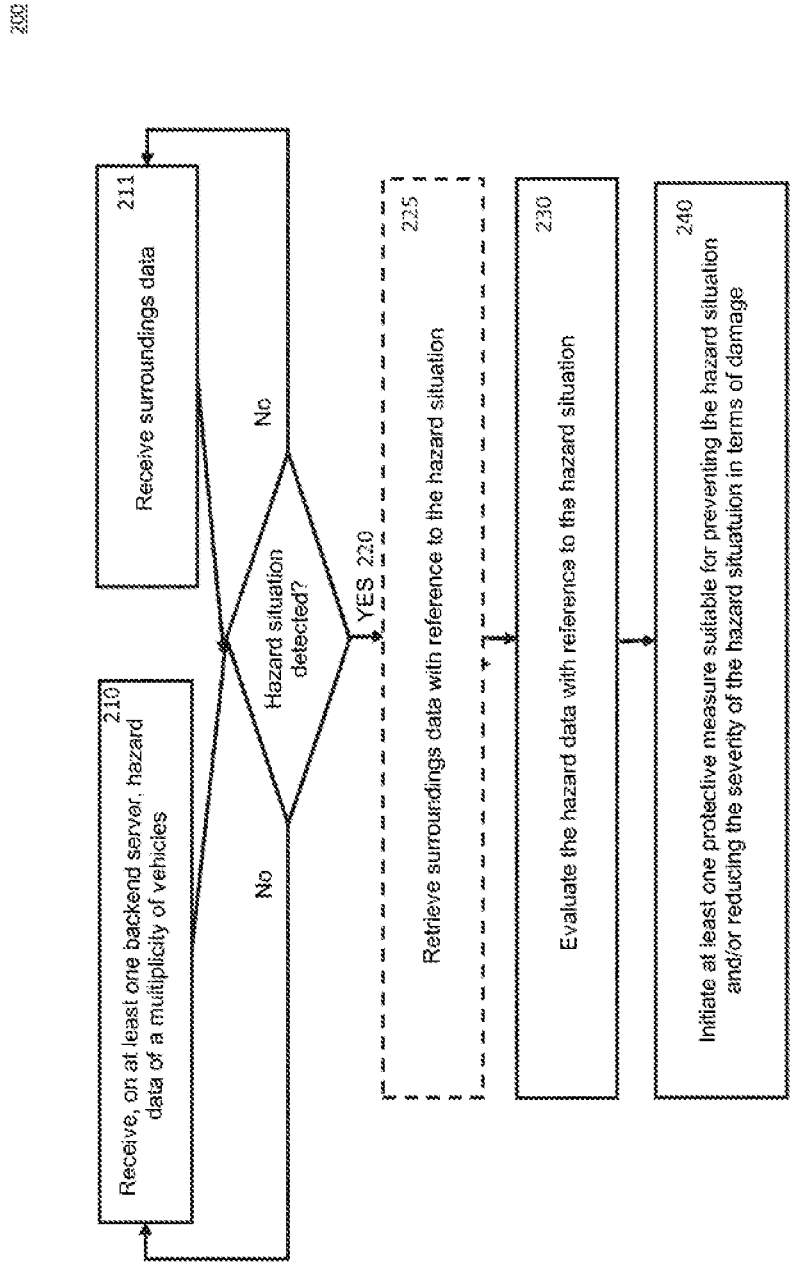
FIG. 2 shows a flowchart illustrating a method for reducing the hazard potential in road traffic.

Furthermore or alternatively, the backend server 120 can be configured to retrieve surroundings data from appropriate service providers, for example (cf. step 211 and/or 225 in FIG. 2).

In particular, surroundings data can comprise, by way of example:
- a population density;
- a traffic density at the time of the hazard situation;
- main thoroughfares in a predefined radius around the position of the hazard situation;
- current weather data;
- a model of the surroundings of a vehicle comprising a fully autonomous driving mode; and/or
- other hazard data comprising the predefined radius around the position of the hazard situation.

The result of the evaluating of the hazard data can be a hazard potential. The hazard potential can comprise the highly up-to-date digital map.

There follows an example hazard potential. In this example, the hazard situation is a fire in the parking garage. The evaluating of this fire as a hazard situation in combination with the stored amount of energy, energy type, chemical composition, physical shape, physical size, etc., of vehicles situated close by (model of the surroundings) allows the hazard potential to be rated or ascertained. On the basis of the rated or ascertained hazard potential, measures can be taken by taking into consideration the model of the surroundings, prediction analyses and/or prediction scenarios. As a rule, multiple measures can be taken. The backend server 120 can take the model of the surroundings that results from the surroundings data as a basis for ascertaining one or more measures that lead to the least damage and/or lead to the least injuries, taking into consideration stipulated or stipulable prioritizations of criteria. In one example, the backend server 120 can initiate the one or more measures that it has ascertained itself. In another example, the backend server 120 can show multiple alternative measures with an assessment of the respective accompanying extended damage. A person (or multiple people) responsible for deciding about the measures to be performed then determines which measure(s) are performed.

The backend server 120 is therefore configured to initiate at least one protective measure in accordance with the evaluated hazard data.

The protective measure can comprise notifying rescue and/or emergency services about a hazard potential in accordance with the evaluated hazard data.

The backend server 120 can be configured to transmit a hazard potential, which is the result of the evaluating of the hazard data and can comprise the highly up-to-date digital map, to rescue and/or emergency services. Advantageously, the rescue and/or emergency services can thus best prepare themselves for the hazard situation, as a result of which the hazard potential with reference to the hazard situation is reduced.

Furthermore or alternatively, the protective measure can comprise division of a predefined region around the position of the hazard situation into hazard zones in accordance with the evaluated hazard data.

The backend server 120 can be configured to divide a predefined region around the position of the hazard situation into hazard zones in accordance with the evaluated hazard data. The division into hazard zones can also be transmitted to rescue and/or emergency services, for example. Advantageously, the rescue and/or emergency services can thus adapt their actions to the hazard zones, which reduces the hazard potential with reference to the hazard situation.

Furthermore or alternatively, the protective measure can comprise a recommendation to clear buildings and/or squares. This recommendation can also be transmitted to rescue and emergency services, so that they can make a decision faster, so that the risk of potentially injured people with reference to the hazard situation is reduced.

The backend server 120 can be configured to receive responses in regard to the measures performed or initiated (e.g. from recovery and/or rescue services) and to use the responses for optimization (e.g. using suitable deep learning algorithms) in order to continuously optimize measures for future hazard situations.

Furthermore or alternatively, the protective measure can comprise an activation of at least one function of a safety device. Safety devices can be intelligent objects 130A . . . 130N, e.g. intelligent ventilation systems in buildings, vehicles, etc.; intelligent sprinkler systems in buildings, vehicles, intelligent infrastructure systems, etc. Functions of the safety devices can be switching the ventilation on or off, switching the sprinkler system on or off, etc. The at least one function of a safety device is activated with reference to the evaluated hazard data.

Furthermore or alternatively, the protective measure can comprise a warning to other road users. By way of example, the backend server 120 can be configured to send an appropriate message to the communication units of vehicles of other road users affected by the hazard situation. The message can comprise a warning that can be output via a suitable output unit of the respective vehicles.

Furthermore or alternatively, the protective measure comprises active intervention in the driving dynamics and/or trajectory planning of other road users. The backend server 120 can for example transmit a suitable message to the communication unit of vehicles that support highly automated driving (HAF) or fully automated driving (VAF). The message can comprise applicable data suitable for vehicles affected by the hazard situation to actively intervene in the driving dynamics and/or trajectory planning.

By way of example, a hazard situation can be a burning building. The backend server 120 is able, following evaluation of the hazard data, to send a message to activate the sprinkler installation to an intelligent sprinkler system in the building. Furthermore or alternatively, the backend server 120 can transmit a message to intelligent traffic lights in a predefined region or area around the burning building, so that they set the signals such that no further vehicles enter this region, but rather they can only leave the region.

At least one vehicle 110 can have a fully autonomous driving mode. In this case, the protective measure can furthermore or alternatively comprise asking the vehicle 110 comprising the fully autonomous driving mode to autonomously leave a predefinable or predefined region around the position of the hazard situation.

By way of example, the backend server 120 can be configured to transmit an appropriate message to the communication module 112 of the vehicle 110. The message can comprise a request to leave a predefined region and also the predefined region of a digital map around the position of the hazard situation. Alternatively, the message can comprise the request to leave the predefined region and also a position on the digital map toward which the vehicle 110 is supposed to move. The position is outside the predefined or predefinable region around the position of the hazard situation. A computing unit 114 can process the message and a control module 115 can control the vehicle 110 such that it autonomously leaves the predefined region. The vehicle 110 can comprise a navigation module storing a digital roadmap locally in the vehicle 110. Advantageously, parking vehicles comprising an autonomous driving mode can thus move away from the hazard situation, which minimizes the hazard potential further.

FIG. 2 shows a flowchart illustrating a method 200 for reducing the hazard potential in road traffic as described earlier on with reference to FIG. 1.

The method 200 comprises receiving 210, on a backend server 120, hazard data of the vehicles 110, wherein the hazard data comprise current filling state data of at least one energy store and also a current position of the respective vehicle 110.

The method 200 can moreover comprise receiving 211, on the backend server 120, surroundings data with reference to the hazard situation. The surroundings data can comprise:
- a population density;
- a traffic density at the time of the hazard situation;
- a hazard potential of surrounding buildings, areas, halls, etc.;
- main thoroughfares in a predefinable region around the position of the hazard situation;
- an inattentive driver;
- defective driver assistance systems in the case of highly automated driving (HAF), or fully automated driving (VAF);
- defective trajectory planning in the case of HAF or VAF; and/or
- other hazard data comprising the predefinable region around the position of the hazard situation.

The receiving 211 of the surroundings data with reference to the hazard situation can take place periodically, for example. Periodically receiving 211 surroundings data can advantageously be useful when detecting a hazard situation.

Moreover, the method 200 comprises capturing 220, on the backend server 120, hazard situation data comprising at least one position and also a type of a hazard situation. When a hazard situation is captured 220, a next step involves evaluating 230, by means of the backend server 120, the hazard data of the vehicles 110, 110A . . . 110N with reference to the hazard situation data. The evaluating 230 of the hazard data can moreover comprise evaluating the surroundings data with reference to the position of the hazard situation. The surroundings data can be periodically retrieved or received before the hazard situation is captured 220 (step 211).

Furthermore or alternatively, possibly expanded, more detailed, more up-to-date, etc., surroundings data with reference to the hazard situation can be retrieved after the hazard situation 225 is captured 220 (step 225). This can be effected for example by polling vehicles, intelligent objects, etc., affected by the hazard situation.

The method moreover comprises automatically initiating 240 at least one protective measure in accordance with the evaluated hazard data. The protective measure can comprise notifying rescue services about a hazard potential in accordance with the hazard data of the vehicles 110 whose current position is in a predefinable region around the position of the hazard situation. Furthermore or alternatively, the protective measure can comprise division of a predefinable region around the position of the hazard situation into hazard zones in accordance with the evaluated hazard data. Furthermore or alternatively, the protective measure can comprise a recommendation to clear buildings and/or squares. Furthermore or alternatively, the protective measure can comprise the activation of safety devices. Furthermore or alternatively, the protective measure can comprise the warning to other road users or (e.g. in the case of highly automated driving (HAF) or fully automated driving (VAF)) active intervention in the driving dynamics and/or trajectory planning of other road users.

At least one vehicle 110 can comprise a fully autonomous driving mode and be in a predefinable or predefined region, vicinity, etc., around the position of the hazard situation. In this case, the protective measure can furthermore or alternatively comprise asking the vehicle 110, by means of the backend server 120, to autonomously leave a predefinable region around the position of the hazard situation or to move to a position outside the predefined region.

FIG. 3 illustrates an example scenario 300 in which the hazard potential in road traffic is reduced by the method explained with reference to FIGS. 1 and 2.

An example first vehicle 110_1 is shown schematically. The vehicle 110_1 is a vehicle 110 as described earlier on with reference to FIG. 1. The exemplary vehicle 110_1 is in particular an at least partially electrically operated vehicle 110_1, and it has an appropriate energy store 116, for example a high-voltage battery store 116.

Furthermore, a second example vehicle 110_2 is shown schematically. This vehicle 110_2 is an at least partially hydrogen-operated vehicle 110_2 and it has an appropriate energy store 117, a pressure container system 117. The pressure container system 117 is used for storing fuel that is gaseous under ambient conditions. The pressure container system 117 can be used in a motor vehicle 110 that is operated using hydrogen, for example.

Such a pressure container system 117 comprises at least one pressure container, in particular a composite overwrapped pressure vessel (=COPV). The pressure container can be a cryogenic pressure container (=CcH2 or COP) or a high-pressure gas container (=CGH2), for example.

High-pressure gas containers are designed to store fuel at ambient temperatures permanently at a nominal operating pressure (also called nominal working pressure or NWP) of approximately 350 bar (=overpressure relative to atmospheric pressure), more preferably of approximately 700 bar or more. A cryogenic pressure container is suitable for storing the fuel at the aforementioned operating pressures even at temperatures that are distinctly below the operating temperature of the motor vehicle.

In this scenario, the high-voltage battery store 116 catches fire. As a result, the ambient temperature of the second vehicle 110_2 rises sharply. The rising ambient temperature leads to a weakening of the structure of the high-pressure gas container 117. On account of the fire, there is the risk of a burst tank.

Both vehicles 110_1 and 110_2 have been registered on the backend server 110 by a user, and the type of the respective energy store 116, 117 has been stored. Furthermore, the vehicles send hazard data to the backend server 120 periodically in the driving condition, or otherwise upon events such as stopping the engine and leaving the respective vehicle 110_1 and 110_2. Vehicle 110_1 detects that the energy store 116 has caught fire and sends hazard situation data comprising its own position and also the type of the hazard situation, i.e. energy store 116 burning, to the backend server 120. The backend server 120 evaluates the hazard data from vehicles with reference to the hazard situation. This might comprise reading, from the memory unit 125, a hazard radius for the hazard situation "burning high-voltage battery store". The evaluating reveals that vehicle 120_2 comprising the full high-pressure gas container 117 is in an acute hazard vicinity in relation to vehicle 110_1. The backend server 120 then initiates a protective measure. The protective measure can be informing a central rescue center about the hazard situation and also the drive stores 116, 117 of both vehicles 110_1 and 110_2. Advantageously, the rescue services thus have the necessary information about the drive concepts of the affected vehicle 110_2. In this example, vehicle 120_2 has a fully autonomous driving mode. Initiating 240 the protective measure in this case comprises asking the vehicle 110_2 to leave the hazard radius 310 (represented in this case by a dashed part of the hazard radius 310) for the hazard situation "burning high-voltage battery store" based on vehicle 110_1. This advantageously avoids the risk of the burst tank.

What is claimed is:

1. A method for reducing a hazard potential of a plurality of vehicles having heterogeneous drives, comprising the acts of:
    receiving, at a backend server, hazard data of the plurality of vehicles, wherein the hazard data includes current filling state data of at least one energy store of the plurality of vehicles and a current position of the plurality of vehicles;
    capturing, at the backend server, hazard situation data including a position of a hazard situation and a type of the hazard situation, wherein the hazard situation includes one or both of an abnormal condition of a first one of the plurality of vehicles and a hazard in an environment outside the plurality of vehicles;
    evaluating, at the backend server, the captured hazard situation data to determine based on predetermined hazard criteria whether one or both of the first one of the plurality of vehicles and the hazard situation is a potential hazard to the at least one other vehicle of the plurality of vehicles; and
    initiating, by the backend server, at least one protective measure that minimizes the potential hazard from one or both of the first one of the plurality of vehicles and the hazard situation to the at least one other of the plurality of vehicles in response to the determination that the potential hazard meets the predetermined hazard criteria,
    wherein
        the at least one protective measure includes activation of at least one function of a safety device and actively intervening in driving dynamics or trajectory planning of the at least one other of the plurality of vehicles, and
        the plurality of vehicles does not include a vehicle directed to approach the potential hazard as part of the at least one protective measure.

2. The method according to claim 1, wherein the act of evaluating the hazard data includes evaluating surroundings data associated with the position of the hazard situation.

3. The method according to claim 2, wherein the surroundings data includes at least one of
    a population density,
    a traffic density at the time of the hazard situation,
    a hazard potential of surroundings associated with the position of the hazard situation,
    main thoroughfares in a predefinable region around the position of the hazard situation,
    an inattentive driver,
    defective driver assistance systems in the case of one or more of the plurality of vehicles operating in a highly or fully automated driving mode,
    defective trajectory planning in the case of the of one or more of the plurality of vehicles operating in the highly or fully automated driving mode, and
    other hazard data in the predefinable region around the position of the hazard situation.

4. The method according to claim 3, wherein the at least one protective measure includes notifying rescue services about a hazard potential in accordance with the evaluated hazard data.

5. The method according to claim 4, wherein the at least one protective measure includes division of the predefinable region around the position of the hazard situation into hazard zones in accordance with the evaluated hazard data.

6. The method according to claim 4, wherein the at least one protective measure includes a recommendation to clear at least portions of the surroundings associated with the position of the hazard situation.

7. The method according to claim 4, wherein at least one vehicle of the plurality of vehicles is operating in the fully autonomous driving mode, and the at least one protective measure includes transmitting a signal instructing to the at least one vehicle operating in the fully autonomous mode to autonomously leave the predefinable region around the position of the hazard situation.

8. The method according to claim 4, wherein the at least one protective measure includes transmitting a warning to other road users.

* * * * *